United States Patent [19]

Stratta et al.

[11] Patent Number: 4,597,801
[45] Date of Patent: Jul. 1, 1986

[54] SILANE DISPERSING AGENT FOR MAGNETIC MEDIA

[75] Inventors: Julius J. Stratta, Yorktown Heights; Nicholas Stasiak, Yonkers, both of N.Y.

[73] Assignee: Union Carbide Corporation, Danbury, Conn.

[21] Appl. No.: 741,265

[22] Filed: Jun. 4, 1985

Related U.S. Application Data

[63] Continuation-in-part of Ser. No. 655,585, Sep. 28, 1984, abandoned.

[51] Int. Cl.$^4$ ............................................. B01F 17/00
[52] U.S. Cl. ............................... 106/308 Q; 428/403; 428/447; 428/694; 428/900; 427/128; 360/134
[58] Field of Search ................... 106/308 Q; 427/128; 428/900, 447, 403, 469; 360/134; 252/62.51, 351

[56] References Cited

U.S. PATENT DOCUMENTS

| | | | |
|---|---|---|---|
| 3,144,352 | 8/1964 | Talley | 117/138.8 |
| 4,076,890 | 2/1978 | Yamada et al. | 428/337 |
| 4,196,258 | 4/1980 | Huisman et al. | 428/447 |
| 4,244,987 | 1/1981 | Aydin et al. | 427/130 |
| 4,444,842 | 4/1984 | Yamaguchi et al. | 360/134 |
| 4,501,800 | 2/1985 | Fujiki et al. | 427/128 |
| 4,555,443 | 11/1985 | Kikugawa et al. | 428/447 |

FOREIGN PATENT DOCUMENTS

| | | |
|---|---|---|
| 0048456 | 3/1982 | European Pat. Off. |
| 2543962 | 4/1977 | Fed. Rep. of Germany |
| 0143894 | 11/1979 | Japan |
| 0049767 | 5/1981 | Japan |
| 0205461 | 12/1982 | Japan |
| 0155517 | 9/1983 | Japan |
| 1080614 | 8/1967 | United Kingdom |

OTHER PUBLICATIONS

CA 86:1990325.

Primary Examiner—Paul Lieberman
Assistant Examiner—Hoa Van Le
Attorney, Agent, or Firm—Paul W. Leuzzi

[57] ABSTRACT

Ferromagnetic particles are dispersed for use in magnetic coatings by a novel dispersing agent containing either silylated alkylene oxide copolyethers or isocyanatoalkyl silanes in combination with phosphate esters.

22 Claims, No Drawings

SILANE DISPERSING AGENT FOR MAGNETIC MEDIA

This application is a continuation in part of U.S. Ser. No. 655,585, filed Sept. 28, 1984, now abandoned.

BACKGROUND OF THE INVENTION

This invention relates to a novel silane-containing dispersing agent intended for use in the dispersion of ferromagnetic particles employed in magnetic coating. More particularly, this invention relates to novel compositions containing silylated copolyethers or isocyanato silanes with phosphate esters as the silane-containing dispersing agent.

PRIOR ART

Audio and video tape and other information-storing magnetic media, can be prepared by coating Mylar TM or some other non-magnetic substrate with a solvent-based magnetic coating containing fine ferromagnetic particles dispersed in a suitable polymeric binder. In conventional practice, the acicular (needlelike) ferromagnetic particles are oriented in a magnetic field and the solvent is evaporated.

The current trend in the electronics industry is toward higher information density which can be achieved with suitable dopants (often cobalt) and by the use of progressively smaller ferromagnetic particles of high coercive strength. These factors increase dispersion viscosity enormously. Consequently, effective dispersing agents are needed to achieve the high particle loading density required.

Prior art teaching dispersing agents for magnetic media dates back 15–20 years. U.S. Pat. No. 3,144,352 describes the use of lecithin. British Pat. No. 1,080,614 describes the use of oleic acid lubricant and monobutyl phosphate dispersant. Ger. Offen. No. 2,543,962 teaches the use of aminosilanes for improved dispersibility and abrasion resistance. U.S. Pat. No. 4,076,890 teaches a range of organofunctional silanes as dispersing agents (including alkyl, amino, mercapto, epoxy, vinyl, chloro) in magnetic media for abrasion resistance and reduced drop-out.

Organofunctional silanes have likewise been reported as improving the squareness ratio in magnetic coatings. Japanese Kokai No. 81 49 767 and CA No. 95-99506.

Phosphate dispersants are widely reported in the literature. Sodium methaphosphate (CA No. 86-199032). Potassium dihydrogen phosphate (Japanese Kokai No. 79,143,894). Polyethylenepolypropylene glycol monoether phosphates (Japanese Kokai No. 82,205,461). Dioctylphosphate (European Patent Application No. 48456). Phosphoric acid alkyl ester (U.S. Pat. No. 4,244,987). Lecithin (U.S. Pat. Nos. 3,144,352 and 4,196,258).

Combinations of aminosilanes with a surfactant are disclosed in Japanese Kokai No. 58,155,517 and U.S. Pat. No. 4,244,987.

In broad strokes, the prior art mentions the use of a range of organofunctional silanes for various benefits in magnetic coating. Notably absent, however, are references to polyether silanes or isocyanato silanes. Cited dispersing agents also include a range of candidates, chiefly the phosphates.

The fragile needle-like ferromagnetic particles have an unusually high propensity to form strong aggregates primarily because of magnetic attraction between particles. To a lesser degree, particle asymmetry, surface area, surface roughness and sorbed species (air, water) also favor agglomeration. When an inappropriate dispersing agent is used, mechanical dispersion can fracture the ferromagnetic particle causing a performance loss. This is of particular concern with fine ferromagnetic particles designed for higher information density. Thus an effective dispersing agent, such as presently set forth, performs an important function.

This present invention is novel in that it provides the use of a combination of a polyether silane or isocyanato silane and an organophosphate ester as an effective dispersing agent for use in magnetic coatings. Unexpected benefits in the reduction of viscosity is an important aspect of this invention not previously described in the prior art.

SUMMARY OF THE INVENTION

The novel composition of a silylated copolyether or an isocyanato silane with an organophosphate ester outperformed "state of the art" dispersing agents. The novel dispersant of the present invention was found to be effective when integrally added or pretreated on the ferromagnetic particle. Because dispersion viscosity is effectively reduced, higher pigment loadings without the loss of film integrity; reduced grinding times; reduced surfactant demand; magnetic coatings with improved tensile strength, squareness (ratio of remnant magnetic flux density to saturation magnetic flux density) magnetic properties, surface appearance and less migration of dispersing agent to the surface of the magnetic coating are expected as concomitant benefits.

DETAILED DESCRIPTION OF THE INVENTION

In accordance with the instant invention there is provided a novel dispersing composition useful in the dispersion of ferromagnetic particles in the manufacture of magnetic coatings. This dispersing composition comprises a silylated copolyether or an isocyanato silane with a phosphate ester.

The silylated copolyether employed as a component in the dispersing agent of the present invention is of the general formula:

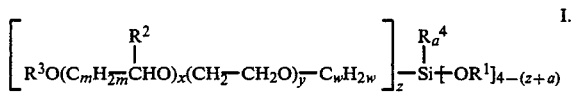

where $R^1$ is individually a hydrogen atom, an alkyl group having from 1 to 12 carbon atoms, an alkoxy alkyl group having from 2 to 12 carbon atoms, or an acyl group having from 6 to 12 carbon atoms; $R^2$ is individually a hydrogen atom, an alkyl group having from 1 to 18 carbon atoms or an aryl group having from 6 to 18 carbon atoms; $R^3$ is individually a hydrogen atom, an alkyl group having from 1 to 12 carbon atoms, an aryl group having from 6 to 18 carbon atoms or an aryl alkyl group having from 7 to 18 carbon atoms; $R^4$ is individually an alkyl group having 1 to 4 carbon atoms; the sum of $x+y$ has a value of from 2 to 100, preferably 10 to 60; z has a value of 1, 2 or 3 and preferably is equal to 1; w has a value 0 to 6, preferably 3; m has a value of 1, 2 or 3; and a has a value of 0 or 1.

Exemplary silylated copolyethers which are useful in practicing the present invention include, but are not limited to,

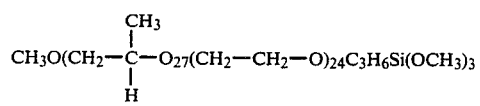
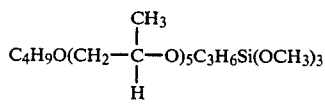
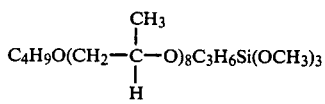
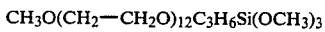
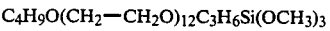
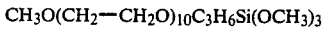
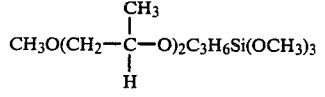
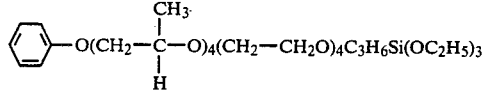
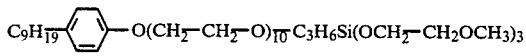
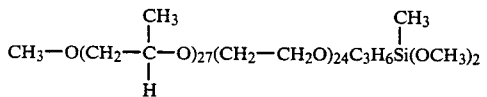
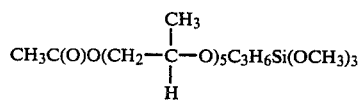
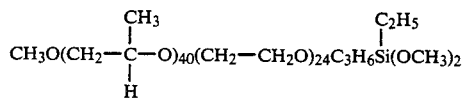

Generally, the silylated copolyethers are commercially available or they may be prepared by reacting a hydroxyl end capped polyether with allyl chloride followed by the hydrosilylation of the adduct, i.e., as taught in U.S. Pat. No. 2,868,824 and U.S. Pat. No. 2,846,458.

The isocyanato silane employed as an alternative to the silylated copolyether component in the dispersing agent is of the general formula

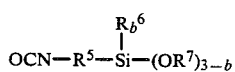

where $R^6$ is individually an alkyl group having 1 to 4 carbon atoms; $R^7$ is individually a hydrogen atom, an alkyl group having from 1 to 12 carbon atoms, an alkoxy alkyl group having from 2 to 12 carbon atoms or an acyl group having from 6 to 12 carbon atoms; b is 0, 1, 2 or 3; and $R^5$ is an alkylene, arylene or aralkylene group having from 1 to 18 carbon atoms or a group of the formula:

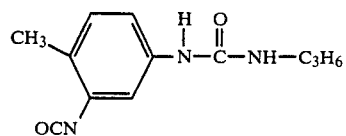

Exemplary isocyanato silanes include but, are not limited to,

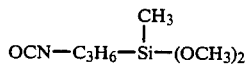
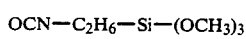
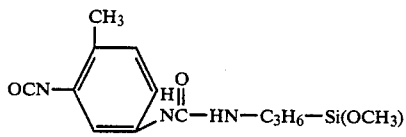
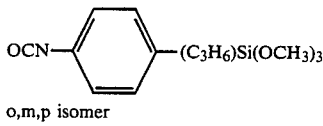
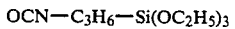

The isocyanato silanes are commercially available or they may be prepared by forming the carbamate adduct of an alkylchloroformate with an aminoalkyltrialkoxy silane and cracking the carbamate to form the isocyanato silane and alkanol. See for instance U.S. Pat. No. 3,607,901.

The phosphate ester employed as a second component in the dispersing agent of the present invention is of the general formula:

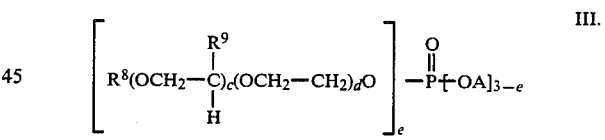

where $R^8$ is a hydrogen atom or an alkyl group containing from 1 to 20 carbon atoms; $R^9$ is a hydrogen atom, an alkyl group containing from 1 to 4 carbon atom, an aryl group containing from 6 to 18 carbon atoms; or an alkylaryl group containing from 7 to 17 carbon atoms; the sum of c+d has a value of from 0 to 100, preferably 0, 1 or 2 when the sum of c+d is greater than zero most preferably c is at least 1; e has a value of 1 or 2; and A is a hydrogen, sodium, potassium or lithium atom or an $NH_4$ group.

Exemplary phosphate esters which are useful in practicing the present invention include, but are not limited to,

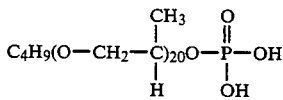

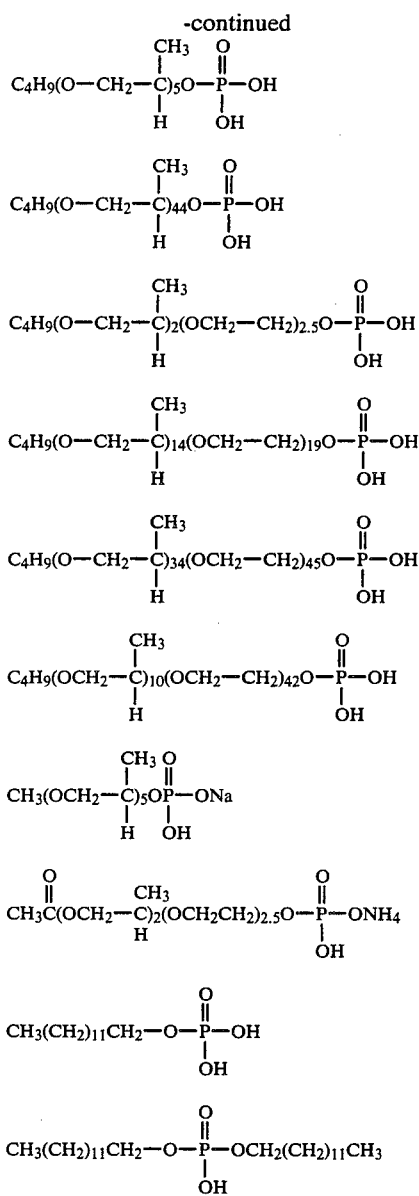

Generally, the phosphate esters may be prepared by the phosphorylation of a hydroxy endblocked polyalkylene oxide or a primary alcohol with polyphosphoric acid or phosphorus pentoxide. It is believed that phosphorylation is preferably conducted in such a manner as to maximize mono-ester formation and minimize formation of diorgano phosphate esters and free phosphoric acid. See U.S. Pat. No. 3,235,627 and U.S. Pat. No. 4,416,830.

In addition to the silylated copolyethers and the phosphate esters, the dispersing agent may optionally contain the following:

(a) Ancillary wetting agents (e.g. lecithin);
(b) Acid scavengers (e.g. propylene oxide);
(c) Organomodified silicone fluids to modify surface tension, surface lubricity or reduce static charge; and
(d) Adhesion promoters.

The ratio of silylated copolyethers to phosphate esters is from 10:90 to 99:1, preferably 25:75 to 75:25.

The ratio of isocyanato silane to phosphate ester is from 35:65 to 99:1 preferably 50:50 to 90:10.

The manner in which the dispersing agent acts to disperse the ferromagnetic particles is subject to scientific conjecture and may involve two separate stages, each requiring a specific component. The understanding of this mechanism is not, however, acritical aspect of this invention.

One component of this present invention is a low molecular weight anionic polyether or alcohol ester acid phosphate which is sorbed on the ferromagnetic particle. In this first stage sorption, the ferromagnetic particles acquire a greater charge and are subsequently separated by electrostatic repulsion which counteracts the usual magnetic forces of attraction. Because most magnetic coating formulations are typically nonaqueous, this electrokinetic effect resides close to the ferromagnetic particle surface. Consequently this first stage sorption gives a quick but short range separation that initiates the deagglomeration process.

This limited separation exposes ferromagnetic particle surface area to a second stage sorption of a higher molecular weight polyether silane which may ultimately covalently bond to the ferromagnetic particle via Si—O linkages. The bulky silylated polyether acts to further increase and maintain ferromagnetic particle separation. Since the force of magnetic attraction diminishes with the distance of particle separation, agglomerates are effectively deagglomerated and the tendency to reagglomerate is diminished.

Additional factors may also be involved. The polyalkylene oxide moiety present in either component of the invention is believed to facilitate desorption of air and water from the ferromagnetic particle surface, render the particle surface more organophilic and therefore more susceptible to wetting by the organic solvent and/or the polymer binder.

Other agents used in the preparation of the magnetic coating include, but are not limited to organic solvents (acetone, MEK, THF, DMF); thermoplastic polymeric binder (polyurethane, PVC, phenoxy resin, acrylic resin, cellulosic resins); thermoset resins (epoxy); electron beam curable oligomers (urethane acrylates); cross linkers or curing agents (polyisocyanates); lubricating agents (silicone fluids, organomodified silicone fluids, fatty acids and corresponding derivatives); antistatic agents (halo- and quarternary nitrogen compounds); conductive pigments (carbon black); wetting agents (lecithin, "Aerosol OT"), and additional silanes to improve adhesion or other properties.

The dispersing agent may be either pretreated onto the ferromagnetic particles from aqueous or organic solvent slurry or integrally added to the coating formulation.

In general the magnetic recording medium consists of a support having thereon a magnetizable recording layer in which the ferromagnetic particles are dispersed in a binder, the contained ferromagnetic particles having been processed with the dispersing agent of the present invention.

The magnetizable powders which can be used in the present invention include the generally known and conventional ferromagnetic powders. Suitable ferromagnetic powders are $\gamma\text{-}Fe_2O_3$, Co doped $\gamma\text{-}Fe_2O_3$, $Fe_3O_4$, Co-doped $Fe_3O_4$, $CrO_2$, ferromagnetic alloy powders or mixtures thereof. Specific examples of these ferromagnetic alloy powders are as follows: Fe-Co, Fe-Ni, Fe-Co-Ni, Fe-Ni-Zn, Fe-Mn-Zn, Fe-Co-Ni-B, Fe-Co-Ni-Cu-Zn, Fe-Co-Ni-Cr, Fe-Co-Ni-P, Fe-Ga-As, Fe-As-Te, Fe-Mn, Zn-Cr, Ni-Co, Ni-Cu, Ni-Cr, Co-Mn, Co-Mg, Ni-Co-As-Sb, Ni-Co-As-Sb, Cr-Ga-As, Cr-As-Te, and Cr-As-Sb, and the like.

These alloys are well-known in the art and are described in U.S. Pat. Nos. 3,026,215; 3,031,341; 3,100,194; 3,242,005 and 3,389,014; British Pat. Nos. 752,659; 782,762 and 1,007,323; French Pat. No. 1,107,654; German Pat. No. OLS 1,281,334. These ferromagnetic powders are generally used at about 300 parts by weight in a binder at a level of about 50 to about 200 parts by wt., preferably 70 to 150 parts by wt. The particle size range of the ferromagnetic powder generally employed is a particle size of 0.2 to 2 micrometers in length, with an aspect ratio of 1/1 to 20/1.

Solid additive particles generally present in the magnetizable layer are inorganic particles such as carbon black, graphite, molybdenum disulfide, tungsten disulfide, clay, silica, carbonates, alumina powder, abrasive materials, metal oxides, etc., and these are particularly effective. Organic particles such as fine powders of fluorine-containing resins, polyolefin resins, polyamide resins, etc., can also be incorporated with no particular detrimental influences. The fluorine-containing resins generally have a molecular weight from about 80,000 to about 120,000 and are materials such as trifluorochloroethylene, tetrafluorethylene, etc., the polyolefins resins generally have a molecular weight of about 800,000 to about 1,200,000 and are materials such as polyethylene, polypropylene, etc., and the polyamide resins generally have a molecular weight of about 5,000 to about 200,000 and are materials such as 6-nylon, 6,6-nylon, 6,10-nylon, 7-nylon, 9-nylon, 11-nylon, and the like. These materials are described in Japanese Patent Publication Nos. 40461/71 and 32001/72. These solid additive particles are added, in particular, as antistatic agents, lubricants, surface-matting agents or a tape durability-improving agents as described in U.S. Pat. Nos. 3,293,066; 2,258,106; 3,312,563; 3,517,378 and 3,630,914. They are often utilized generally in the production of tapes at a level of about 0.1 to 25 wt.%, preferably 0.2 to 13 wt.%, of the inorganic or organic particles per 100% by wt. of the ferromagnetic powder; with particle sizes of about 0.02 to about 2 microns, preferably 0.08 to 1 micrometers, being generally used.

As the binder used for the recording layer in the present invention, a conventionally known thermoplastic resin, thermosetting resin, (or reaction-type resin) or mixtures thereof are used.

As the thermoplastic resins, those having a softening point of less than 150° C., a mean molecular weight of about 10,000 to about 200,000 and a copolymerization degree of about 400 to about 500, such as vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-stryene copolymers, methacrylate-acrylonitrile copolymers, methacrylate-vinylidene chloride copolymers, methacrylate-styrene copolymers, urethane elastomers, polyvinyl fluorides, vinylidene chloride-acrylonitrile copolymers, butadiene-acrylonitrile copolymers, polyamide resins, polyvinyl butyrals, cellulose derivatives (such as cellulose diacetate cellulose triacetate, cellulose propionate, cellulose acetate butyrate, nitrocellulose etc.), styrene-butadiene copolymers, polyester resins, chlorovinyl ether-acrylate copolymers, amino resins, various synthetic rubber thermoplastic resins, and the like, are used.

The thermosetting resin or reaction-type resin used preferably has a molecular weight of less than about 200,000 in the state of a coating solution and, upon heating after coating and drying, the molecular weight becomes infinite due to the reaction of condensation, addition, etc. Of these resins, those which are not softened or melted before the thermal condensation are preferred. To be specific, there are, for example, phenol resins, urea resins, melamine resins, alkyd resins, silicone resins, acrylic reactive resins, epoxy-polyamide resins, a mixture of a high molecular weight polyester resin and an isocyanate prepolymer, a mixture of a methacrylate copolymer and a diisocyanate prepolymer, a mixture of polyester polyol and a polyisocyanate, urea-formaldehyde resins, a mixture of a low molecular weight glycol/high molecular weight diol/triphenylmethane-isocyanate, polyamide resins and mixtures thereof.

The magnetic recording layer may be formed by dissolving the above-described composition in an organic solvent and applying the resulting coating solution to the base support. As the organic solvent used upon coating, there can be employed ketones such as acetone, methyl ethyl ketone, methyl isobutyl ketone, cyclohexanone, etc., alcohols such as methanol, ethanol, propanol, butanol, etc., esters such as methyl acetate, ethyl acetate, butyl acetate, proply acetate, amyl acetate, ethyl lactate, glycol acetate monoethyl ether, etc.; ethers; glycol ethers such as glycol dimethyl ether, glycol monoethyl ether, dioxane, etc.; aromatic hydrocarbons such as benzene, toluene, xylene, etc.; chlorinated hydrocarbons such as methylene chloride, ethylene chloride, carbon tetrachloride, chloroform, trichloroethane, dichlorobenzene, and the like. The magnetic recording layer may also be a water-borne formulation or an electron beam curable formulation.

Suitable supports which can be used in the present invention are those having a thickness of about 5 to 50μ, preferably 10 to 40μ, and suitable examples of supports are supports of polyesters such as polyethylene terephthalate; polyolefins such as polypropylene; cellulose derivatives such as cellulose triacetate, cellulose diacetate; polycarbonate, and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

Low viscosity values are a measure of effective performance and probably indicative of one or more of the following concomitant advantages: (a) higher loading of magnetic iron oxide. (i.e., higher information storage density), (b) reduced grinding time, and/or (c) reduced surfactant demand.

DEFINITIONS

A. Gafac RE-610; MW 800

A mixture containing the following components with typical concentrations:

H19C9—⟨phenyl⟩—(OCH2CH2)11—O—P(=O)(OH)—OH     (63 mole %)

[H19C9—⟨phenyl⟩—(OCH2CH2)11—O—]2—P(=O)—OH     (26 mole %)
MW~800

Free Phosphoric Acid     (11 mole %)

HO—P(=O)(OH)—OH

Water     0.5 wt % max

B. Soya Lecithin (Central 3F-UB or Centrolex P from Central Soya Corp.)

A mixture. A phophatide residue from manufacture of soybean oil.

A major (~60–70%) component

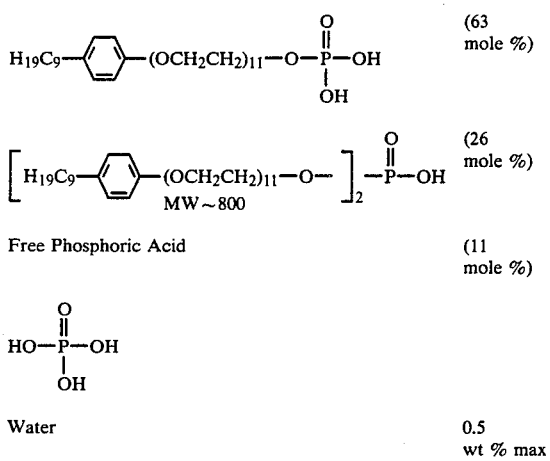

β-Phosphatidylcholine
R = typically $C_{16}$–$C_{18}$

Candidate Dispersants

S-1—Me$(OC_3H_6)_{27}(OC_2H_4)_{24}OC_3H_6Si(OMe)_3$
S-2—γ-Isocyanatotriethoxysilane
S-3—γ-Aminopropyltriethoxysilane
S-4—$CH_3O(C_2H_4O)_{12}(CH_2)_3Si(OCH_3)_3$
S-5—$C_4H_9O(C_3H_6O)_5(CH_2)_3Si(OCH_3)_3$
S-6—$CH_2CCH_3COO(CH_2)_3Si(OCH_3)_3$
S-7—1:1 wt blend of S-6 and S-8
S-8—$CH_3O(CH_2CH_2O)_{75}C_3H_6Si(OCH_3)_3$ P-1     Bu$(OC_3H_6)_{20}$—O—P(=O)(OH)—OH     40–85 mole %

MW~1,300

Corresponding Diorganic Ester: 2–20 mole%
Free Phosphoric Acid: 2–45 mole%

P-2 - Composition prepared by phosphorylation of Bu$(O_3C_6H_{17})$—OH
MW~1040

P-3 - $C_4H_9O(CH_2CH_2O)_{18}(CH_2C(CH_3)—O)_{14}H$
         |
         H

P-4 - (Cyclophos PV4): HOP(=O)(OH)O$(CH_2CH_2O)_4(CH(CH_3)CH_2)_{25}$OP(=O)(OH)OH P-5 = $[CH_3(CH_2)_{11}CH_2O]_n$—P(=O)—$(OH)_{3-n}$ approximately 50 mole percent n = 1
approximately 50 mole percent n = 2

P-6 = $[CH_3(CH_2)_6CH_2O]_n$—P(=O)—$(OH)_{3-n}$ approximately 50 mole percent n = 1
approximately 50 mole percent n = 2

The results are attached as follows:

PROCEDURE I

Preparation of Magnetic Coatings

Wet Grind 2.06 grams of the dispersant candidate is first dissolved in 32.2 grams of cyclohexanone solvent. To this solution are added 51.4 grams dry magnetic iron oxide and 25.0 grams Polyurethane Solution (15.0 wt.% "Estane" 5701F-1 in a cyclohexanone solvent). Initial premixing is done with a hand spatula to wet all ingredients. The resultant slurry is then ground at 3,500 rpm for 30 minutes on an Eiger Mini-50 Motor Mill.

Let Down

To the Wet Grind, 32.0 grams of Polyurethane Solution are slowly added while grinding. Then grinding is continued at 3,500 rpm for additional 30 minutes on the Eiger Mini-50 Motor Mill.

The final dispersion contains 4.00 wt.% dispersant candidate based upon the weight of contained magnetic iron oxide.

| Component | Final Dispersion Wt. % | Final Dispersion Vol. % | Cast Film Wt. % | Cast Film Vol. % |
|---|---|---|---|---|
| Magnetic Iron Oxide | 36.03 | 10.41 | 82.9 | 54.5 |
| Polyurethane Binder | 5.99 | 6.72 | 13.8 | 35.2 |
| Dispersant Candidate | 1.44 | 1.96 | 3.3 | 10.3 |
| Cyclohexanone Solvent | 56.54 | 80.91 | — | — |
|  | 100.0 | 100.0 | 100.0 | 100.0 |

PROCEDURE II

Preparation of Cast Films

A 50 mil wet film is cast on silicone-coated release paper and air dried for one week. The dried film is stripped from the release paper, cut into test strips and allowed to air dry for an additional week.

PROCEDURE III

Preparation of Electron Beam Curable Magnetic Coating

Wet Grind 1.63 grams of the dispersant candidate are first dissolved in 15.00 grams of cyclohexanone solvent. To this solution are added 34.09 grams of dry magnetic iron oxide and 19.44 grams of an electron beam curable polyurethane resin solution (Rd 4345-60 from Lord Corp, a medium molecular weight resin as a 58 wt.% solution in cyclohexanone). Initial premixing is done with a hand spatula to wet all ingredients. The resultant slurry is then ground at 3500 rpm for 30 minutes on an Eiger-Mini-50 motor mill.

Let Down

To the Wet Grind an additional 29.84 grams of cyclohexanone are slowly added while grinding. Then grinding is continued at 3500 rpm for an additional 30 minutes on the Eiger Mini-50 motor mill.

The final dispersion contains 4.78 wt.% dispersant candidate based on the weight of contained magnetic iron oxide.

| | Final Formulation | | | |
|---|---|---|---|---|
| | Final Dispersion | | Cast Film | |
| Component | Wt. % | Vol. % | Wt. % | Vol. % |
| Magnetic Iron Oxide | 34.09 | 9.77 | 72.53 | 39.84 |
| Polyurethane Resin Solids | 11.28 | 12.56 | 24.00 | 51.20 |
| Dispersant Candidate | 1.63 | 2.20 | 3.47 | 8.96 |
| Cyclohexanone | 53.00 | 75.47 | — | — |
| | 100.0 | 100.0 | 100.0 | 100.0 |

Types of Magnetic Iron Oxide

A = Hercules TMOG-642. High coercive strength (Coercive Force = 650 Oersteds), Cobalts Doped $\gamma$-$Fe_2O_3$. Acicular particle, length = 0.20 micrometers, aspect ration = 8–10.

B = Pfizer "Pferrox" 228HC, $\gamma$-$Fe_2O_3$ with no cobalt dopant. Coercive force (oersteds), 350; Specific Magnetization (emu/g), 74; Average length (micrometers), 0.35; Average width (micrometers), 0.06; Acicularity Ratio, 6; Powder Density (g/cm$^3$), 0.8; Particle Density (g/cm$^3$), 4.7; pH, 3.0; Oil Absorption (ml/100 g), 50; Specific Surface Area (m$^2$/g), 24.

Polymeric Binder

"Estane" 5701F-1 is a block copolymer having a glass transition temperature of −28° C. It consists of 60% soft block and 40% hard block. The soft block is ~2,000 MW polyester of Adipic Acid and 1,4-Butanediol. The hard block is ~1,500 MW polyurethane prepared from 4,4'-Diisocyanate Diphenyl Methane and 1,4-Butanediol.

Method of Introducing Dispersant

C = Integral Addition, i.e., dissolving of dispersing agent in cyclohexanone solvent prior to addition of untreated magnetic iron oxide and polyurethane binder. Formulation detail in Procedure I.

D = Pretreatment of dispersing agent on magnetic iron oxide in toluene slurry. Pretreated oxide is vacuum dried for two hours @ 120° C. In preparing subsequent dispersion (Procedure I) magnetic iron oxide content corrected for weight of dispersing agent pretreatment.

E = Pretreatment of dispersing agent on magnetic iron oxide in water slurry. Same drying conditions and dispersion preparation considerations as for (D).

TABLE I

Viscosity values achieved with various dispersing agents made from Procedure I obtained at 25° C. using a Wells-Brookfield cone and plate viscometer. Shear thinning index is viscosity at 1 reciprocal second divided by viscosity at 200 reciprocal seconds. The thixotropic degree represents the hysterysis of the rheogram.

TABLE II

Cast film properties achieved on films made from with various dispersing agents made from Procedure I. The films are made by Procedure II.

TABLE III

Viscosity values achieved with various dispersing agents made from Procedure III.

TABLE IV

Provides a generic description of the magnetic iron oxide, polymeric binder, candidate organosilicon dispersing agents and dispersing agents evaluated. Mode of introducing candidate dispersant also defined.

TABLE I

| | CANDIDATE DISPERSANT | METHOD | TYPE | DISPERSION RHEOLOGY | | | |
|---|---|---|---|---|---|---|---|
| EXAMPLE | Candidate | WT. % BASED ON MAGNETIC OXIDE | OF INTRO- DUCING DISPER- SANT | OF MAGNETIC IRON OXIDE USED | VIS (cps.) @ 1.0 SEC. − 1 | VIS. (cps.) @ 200 SEC. − 1 | SHEAR THINNING INDEX | DEGREE OF THIXO- TROPY % |
| A | None | — | — | A | 113,000 | 3,650 | 31.0 | 45 |
| B | None | — | — | B | 61,400 | 1,400 | 42.6 | 10 |
| 1 | S-1 (2.0%) P-1 (2.0%) | 4.0 | C | A | 15,700 | 950 | 16.5 | 17 |
| 2 | S-1 (2.0%) P-1 (2.0%) | 4.0 | D | A | 18,900 | 940 | 20.0 | 17 |
| 3 | S-1 (2.0%) P-1 (2.0%) | 4.0 | E | A | 14,200 | 660 | 21.4 | 22 |
| 4 | S-1 (2.0%) P-1 (2.0%) | 4.0 | C | B | 9,440 | 440 | 21.4 | 22 |
| C | "Gafac" RE-610 | 4.0 | C | A | 44,000 | 1,460 | 30.1 | 11 |
| D | "Gafac" RE-610 | 4.0 | C | B | 20,500 | 870 | 23.6 | 31 |
| E | P-1 | 4.0 | C | A | 39,200 | 1,270 | 30.9 | 20 |
| F | S-1 | 4.0 | C | A | 55,000 | 2,340 | 23.5 | — |
| 5 | P-1 (2.0%) S-2 (2.0%) | 4.0 | C | A | 31,400 | 1,770 | 17.7 | 80 |
| G | P-1 (2.0%) S-3 (1.0%) P-3 | 4.0 | C | A | 23,600 | 1,720 | 13.7 | 93 |
| 6 | P-1 (2.0%) S-4 (2.0%) | 4.0 | C | A | 34.600 | 1,450 | 23.9 | 14 |

TABLE I-continued

| EXAMPLE | CANDIDATE DISPERSANT Candidate | WT. % BASED ON MAGNETIC OXIDE | METHOD OF INTRO-DUCING DISPER-SANT | TYPE OF MAGNETIC IRON OXIDE USED | DISPERSION RHEOLOGY VIS (cps.) @ 1.0 SEC. −1 | VIS. (cps.) @ 200 SEC. −1 | SHEAR THINNING INDEX | DEGREE OF THIXO-TROPY % |
|---|---|---|---|---|---|---|---|---|
| 7 | P-1 (2.0%) S-5 (2.0%) | 4.0 | C | A | 56,600 | 2,330 | 24.3 | 25 |
| H | Soya Lecithin (2.0%) S-1 (2.0%) | 4.0 | C | A | 70,800 | 2,850 | 25.0 | 56 |
| I | Gafac RE-610 (2.0%) S-1 (2.0%) | 4.0 | C | A | 55,100 | 1,860 | 29.6 | 11 |
| 8 | P-2 (2.0%) S-1 (2.0%) | 4.0 | C | A | 56,500 | 2,220 | 25.4 | 11 |
| 9 | P-2 (2.0%) S-1 (2.0%) | 4.0 | C | A | 70,000 | 2,320 | 30.5 | 4 |
| J | "Cyclophos" (2.0%) S-1 (2.0%) | 4.0 | C | A | 31,500 | 1,420 | 22.2 | 50 |
| 10 | S-1 (1.0%) P-1 (1.0%) "Gafac" RE-610 (2.0%) | 4.0 | C | A | 17,300 | 630 | 27.5 | 27 |
| K | S-2 | 4.0 | C | A | 42,400 | 1,990 | 21.3 | 59 |
| 11 | S-3 (2.0%) P-3 (2.0%) | 4.0 | C | A | 44,000 | 1,750 | 25.1 | 21 |
| L | Soya Lecithin | 4.0 | C | A | 40,900 | 1,670 | 24.5 | 27 |
| 12 | 1.0% P-1 3.0% S-1 | 4.0 | C | A | 22,000 | 1,650 | 13.3 | 85 |
| 13 | 2.0% P-1 2.0% S-1 | 4.0 | C | A | 15,700 | 771 | 20.4 | 50 |
| 14 | 3.0% P-1 1.0% S-1 | 4.0 | C | A | 31,500 | 1,000 | 31.5 | 10 |
| 15 | 3.0% S-2 1.0% P-1 | 4.0 | C | A | 18,900 | 760 | 24.9 | 67 |
| 16 | 2.0% S-2 2.0% P-1 | 4.0 | C | A | 26,700 | 849 | 32 | 12 |
| 17 | 2.0% S-2 2.0% P-1 | 4.0 | C | A | 31,400 | 1770 | 17.7 | — |
| 18 | 1.0% S-2 3.0% P-1 | 4.0 | C | A | 39,300 | 1,340 | 29.4 | 40 |
| V | P-5 | 4.0 | C | A | 26,700 | 1,420 | 20.2 | 59 |
| W | P-6 | 4.0 | C | A | 26,700 | 1,380 | 19.4 | 35 |
| 22 | 2.0% S-1 2.0% P-5 | 4.0 | C | A | 15,700 | 600 | 23.6 | 20 |
| 23 | 2.0% S-1 2.0% P-6 | 4.0 | C | A | 25,200 | 1090 | 23.2 | 25 |

TABLE II

| EXAMPLE | CANDIDATE DISPERSANT Candidate | WT % BASED ON MAGNETIC OXIDE | METHOD OF INTRODUCING DISPERSANT | TYPE OF MAGNETIC IRON OXIDE USED | CAST FILM PROPERTIES Gloss @ 60° | Tensile Strength (psi) |
|---|---|---|---|---|---|---|
| 1 | S-1 (2.0%) P-1 (2.0%) | 4.0 | C | A | 47.1 | 799 |
| 2 | S-1 (2.0%) P-1 (2.0%) | 4.0 | D | A | | |
| 3 | S-1 (2.0%) P-1 (2.0%) | 4.0 | E | A | | |
| 4 | S-1 (2.0%) P-1 (2.0%) | 4.0 | C | B | | |
| C | "Gafac" RE-610 | 4.0 | C | A | 81.7 | 553 |
| E | P-1 | 4.0 | C | A | 29.3 | 445 |
| F | S-1 | 4.0 | C | A | 24.7 | — |
| 5 | P-1 (2.0%) S-2 (2.0%) | 4.0 | C | A | 11.9 | 571 |
| G | P-1 (2.0%) S-3 (1.0%) P-3 (1.0%) | 4.0 | C | A | 33.0 | — |
| I | Gafac R-610 (2.0%) S-1 (2.0%) | 4.0 | C | A | 63 | 896 |
| 8 | P-2 (2.0%) S-1 (2.0%) | 4.0 | C | A | 61.4 | — |
| 9 | P-2 (2.0%) S-1 (2.0%) | 4.0 | C | A | 48.5 | — |
| J | "Cyclophos" (2.0%) | | | | | |

TABLE II-continued

| | CANDIDATE DISPERSANT | | | | CAST FILM PROPERTIES | |
|---|---|---|---|---|---|---|
| EXAMPLE | Candidate | WT % BASED ON MAGNETIC OXIDE | METHOD OF INTRODUCING DISPERSANT | TYPE OF MAGNETIC IRON OXIDE USED | Gloss @ 60° | Tensile Strength (psi) |
| | S-1 (2.0%) | 4.0 | C | A | 15.6 | — |
| 10 | S-1 (1.0%) P-1 (1.0%) "Gafac" RE-610 (2.0%) | 4.0 | C | A | 31.6 | 531— |
| K | S-2 | 4.0 | C | A | 13.6 | 737 |
| 11 | P-3 (2.0%) S-3 (2.0%) | 4.0 | C | A | 40.3 | 593 |

TABLE III

| | CANDIDATE DISPERSANT | | METHOD OF INTRODUCING DISPERSANT | TYPE OF MAGNETIC IRON OXIDE USED | DISPERSION RHEOLOGY | | | |
|---|---|---|---|---|---|---|---|---|
| EXAMPLE | Candidate | WT % BASED ON MAGNETIC OXIDE | | | VIS. (cps.) @ 1.0 SEC. − 1 | VIS. (cps.) @ 200 SEC. − 1 | SHEAR THINNING INDEX | DEGREE OF THIXOTROPY % |
| M | None | — | — | A | 73,900 | 417 | 177 | — |
| N | "Centrolex P" Lecithin From Control Soya | 4.78 | C | A | 15,700 | 330 | 47.6 | 60 |
| 19 | S-1 (2.39) P-1 (2.39) | 4.78 | C | A | 4,720 | 181 | 26.1 | 66 |
| O | "Gafac RE610" | 4.78 | C | A | 7,865 | 197 | 40.0 | 60 |
| P | P-1 | 4.78 | C | A | 7,865 | 189 | 41.7 | 40 |
| Q | S-2 | 4.78 | C | A | 12,600 | 236 | 53.4 | 50 |
| R | S-1 | 4.78 | C | A | 14,200 | 354 | 40.1 | 33 |
| S | S-6 | 4.78 | C | A | 26,700 | 393 | 68.0 | 29 |
| T | S-3 | 4.78 | C | A | 28,300 | 684 | 41.4 | 161 |
| U | S-7 | 4.78 | C | A | 31,500 | 629 | 50.0 | 30 |
| 20 | S-2 (2.39) P-1 (2.39) | 4.78 | C | A | 9,439 | 244 | 38.7 | 33 |
| 21 | S-2 (3.59) P-1 (1.19) | 4.78 | C | A | 15,731 | 346 | 45.5 | 30 |

We claim:

1. A dispersing agent comprising (a) a silane selected from the group consisting essentially of a silylated copolyether of the general formula:

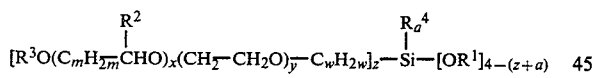

$$[R^3O(C_mH_{2m}CHO)_x(CH_2-CH_2O)_y-C_wH_{2w}]_z-Si-[OR^1]_{4-(z+a)}$$

with $R^2$ and $R^4_a$ as the substituents shown.

where $R^1$ is individually a hydrogen atom, an alkyl group having from 1 to 12 carbon atoms, an alkoxy alkyl group having from 2 to 12 carbon atoms, or an acyl group having from 6 to 12 carbon atoms; $R^2$ is individually a hydrogen atom, an alkyl group having from 1 to 18 carbon atoms or an aryl group having from 6 to 18 carbon atoms; $R^3$ is individually a hydrogen atom, an alkyl group having from 1 to 12 carbon atoms, an aryl group having from 6 to 18 carbon atoms or an aryl alkyl group having from 7 to 18 carbon atoms; $R^4$ is individually an alkyl group having 1 to 4 carbon atoms; the sum of x+y has a value of from 2 to 100; z has a value of 1, 2 or 3; w has a value 0 to 6; m has a value of 1, 2 or 3; and a has a value of 0 or 1;

and an isocyanato silane of the general formula:

$$OCN-R^5-Si-(OR^7)_{3-b}$$

with $R^6_b$ as a substituent.

where $R^6$ is individually an alkyl group having 1 to 4 carbon atoms; $R^7$ is individually a hydrogen atom, an alkyl group having from 1 to 12 carbon atoms, an alkoxy alkyl group having from 2 to 12 carbon atoms or an acyl group having from 6 to 12 carbon atoms; b is 0, 1, 2 or 3; and $R^5$ is an alkylene, arylene or aralkylene group having from 1 to 18 carbon atoms or a group of the formula:

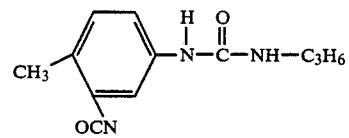

and (b) a phosphate ester of the general formula:

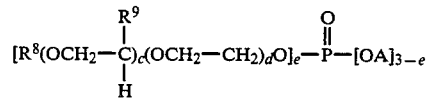

$$[R^8(OCH_2-\underset{H}{\overset{R^9}{C}})_c(OCH_2-CH_2)_dO]_e-P(=O)-[OA]_{3-e}$$

where $R^8$ is a hydrogen atom or an alkyl group containing from 1 to 20 carbon atoms; $R^9$ is a hydrogen atom, an alkyl group containing from 1 to 4 carbon atoms, an aryl group containing from 6 to 18 carbon atoms; or an alkylaryl group containing from 7 to 17 carbon atoms; the sum of c+d has a value of from 0 to 100; e has a value of 1 or 2; and A is a hydrogen, sodium, potassium or lithium atom or an NH4 group; where the ratio of silane to phosphate ester is 10:90 to 99:1 when the silane is a silylated copolyether and 35:65 to 99:1 when the silane is an isocyanato silane.

2. The dispersing agent of claim 1 wherein the ratio of silane to phosphate ester is 25:75 to 75:25 when the silylated copolyether is employed and 50:50 to 90:10 when the isocyanato silane is employed.

3. The dispersing agent of claim 1 wherein the silane is a silylated copolyether where $R^1$ and $R^3$ are alkyl groups, $R^2$ is hydrogen, z is 1, w is 3 and a is 0.

4. The dispersing agent of claim 1 wherein the silane is an isocyanato silane where $R^7$ is an alkyl group, b is 0 and $R^5$ is an alkylene group.

5. The dispersing agent of claim 3 wherein the silane is:

$CH_3O(C_3H_6O)_{27}(C_2H_4O)_{24}C_3H_6Si(OCH_3)_3$.

6. The dispersing agent of claim 3 wherein the silane is:

$CH_3O(C_2H_4O)_{12}(CH_2)_3-Si(OCH_3)_3$.

7. The dispersing agent of claim 3 wherein the silane is:

$C_4H_9O(C_3H_6O)_5(CH_2)_3-Si(OCH_3)_3$.

8. The dispersing agent of claim 3 wherein the silane is:

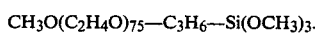
$CH_3O(C_2H_4O)_{75}-C_3H_6-Si(OCH_3)_3$.

9. The dispersing agent of claim 4 wherein the silane is isocyanatotriethoxysilane.

10. A process of dispersing ferromagnetic particles which comprises the use of a dispersing agent comprising (a) a silane selected from the group of silanes consisting essentially of silylated copolyethers of the formula:

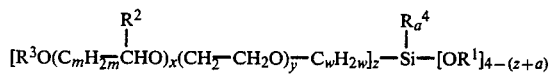
$[R^3O(C_mH_{2m}CHO)_x(CH_2-CH_2O)_y-C_wH_{2w}]_z-Si-[OR^1]_{4-(z+a)}$ where $R^1$ is individually a hydrogen atom, an alkyl group having from 1 to 12 carbon atoms, an alkoxy alkyl group having from 2 to 12 carbon atoms, or an acyl group having from 6 to 12 carbon atoms; $R^2$ is individually a hydrogen atom, an alkyl group having from 1 to 18 carbon atoms or an aryl group having from 6 to 18 carbon atoms; $R^3$ is individually a hydrogen atom, an alkyl group having from 1 to 12 carbon atoms, an aryl group having from 6 to 18 carbon atoms or an aryl alkyl group having from 7 to 18 carbon atoms; $R^4$ is individually an alkyl group having 1 to 4 carbon atoms; the sum of x+y has a value of 1, 2 or 3; w has a value 0 to 6; m has a value of 1, 2 or 3; and a has a value of 0 or 1;

and isocyanato silanes of the formula:

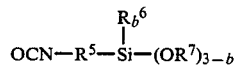
$OCN-R^5-Si-(OR^7)_{3-b}$ where $R^6$ is individually an alkyl group having 1 to 4 carbon atoms; $R^7$ is individually a hydrogen atom, an alkyl group having from 1 to 12 carbon atoms, an alkoxy alkyl group having from 2 to 12 carbon atoms or an acyl group having from 6 to 12 carbon atoms; b is 0, 1, 2 or 3; and $R^5$ is an alkylene, arylene or aralkylene group having from 1 to 18 carbon atoms or a group of the formula:

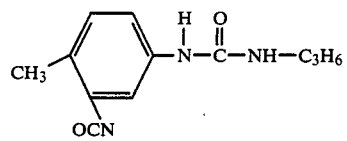

and (b) a phosphate ester of the formula:

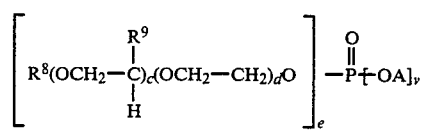

where $R^8$ is a hydrogen atom or an alkyl group containing from 1 to 20 carbon atoms; $R^9$ is a hydrogen atom, an alkyl group containing from 1 to 4 carbon atoms, an aryl group containing from 6 to 18 carbon atoms; or an alkylaryl group containing from 7 to 17 carbon atoms; the sum of c+d has a value of from 0 to 100; e has a value of 1 or 2; and A is a hydrogen, sodium, potassium or lithium atom or an $NH_4$ group.

11. The dispersing agent of claim 10 wherein the ratio of silane to phosphate ester is 25:75 to 75:25 when the silylated copolyether is employed and 50:50 to 90:10 when the isocyanato silane is employed.

12. The dispersing agent of claim 10 wherein the silane is a silylated copolyether where $R^1$ and $R^3$ are alkyl groups, $R^2$ is hydrogen, z is 1, w is 3 and a is 0.

13. The dispersing agent of claim 10 wherein the silane is an isocyanato silane where $R^7$ is an alkyl group, b is 0 and $R^5$ is an alkylene group.

14. The dispersing agent of claim 12 wherein the silane is:

$CH_3O(C_3H_6O)_{27}(C_2H_4O)_{24}C_3H_6Si(OCH_3)_3$.

15. The dispersing agent of claim 12 wherein the silane is:

$CH_3O(C_2H_4O)_{12}(CH_2)_3-Si(OCH_3)_3$.

16. The dispersing agent of claim 12 wherein the silane is:

$C_4H_9O(C_3H_6O)_5(CH_2)_3-Si(OCH_3)_3$.

17. The dispersing agent of claim 12 wherein the silane is:

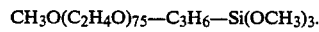
$CH_3O(C_2H_4O)_{75}-C_3H_6-Si(OCH_3)_3$.

18. The dispersing agent of claim 13 wherein the silane is isocyanatotriethoxysilane.

19. The dispersing agent of claim 1 wherein the phosphate ester is

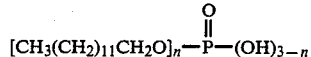
$[CH_3(CH_2)_{11}CH_2O]_n-P-(OH)_{3-n}$ wherein n is 1 in about 50 mole percent of the ester and n is 2 in the remainder.

20. The dispersing agent of claim 1 wherein the phosphate ester is $$[CH_3(CH_2)_6CH_2O]_n-\overset{\overset{O}{\|}}{P}-(OH)_{3-n}$$

wherein n is 1 in about 50 mole percent of the ester and n is 2 in the remainder.

21. The dispersing agent of claim 10 wherein the phosphate ester is $$[CH_3(CH_2)_{11}CH_2O]_n-\overset{\overset{O}{\|}}{P}-(OH)_{3-n}$$

wherein n is 1 in about 50 mole percent of the ester and n is 2 in the remainder.

22. The dispersing agent of claim 10 wherein the phosphate ester is $$[CH_3(CH_2)_6CH_2O]_n-\overset{\overset{O}{\|}}{P}-(OH)_{3-n}$$

wherein n is 1 in about 50 mole percent of the ester and n is 2 in the remainder.

* * * * *